United States Patent
Tanizoe et al.

(10) Patent No.: US 10,131,230 B2
(45) Date of Patent: Nov. 20, 2018

(54) CONTROL APPARATUS FOR VEHICLE

(71) Applicant: MITSUBISHI JIDOSHA KOGYO KABUSHIKI KAISHA, Tokyo (JP)

(72) Inventors: Teppei Tanizoe, Tokyo (JP); Noritaka Aoyama, Tokyo (JP); Kenji Ohmura, Tokyo (JP); Masataka Ohtsuka, Tokyo (JP); Nagamitsu Hiraoka, Tokyo (JP); Ken Hirashita, Tokyo (JP); Takahisa Fujiwara, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/837,332

(22) Filed: Dec. 11, 2017

(65) Prior Publication Data

US 2018/0194226 A1 Jul. 12, 2018

(30) Foreign Application Priority Data

Jan. 10, 2017 (JP) ................. 2017-002104

(51) Int. Cl.
*B60K 35/00* (2006.01)

(52) U.S. Cl.
CPC ...... *B60K 35/00* (2013.01); *B60K 2350/1072* (2013.01); *B60K 2350/352* (2013.01); *B60K 2350/962* (2013.01)

(58) Field of Classification Search
CPC ............ B60K 35/00; B60K 2350/352; B60K 2350/962; B60K 2350/1072
USPC .................................. 701/110, 113
See application file for complete search history.

(56) References Cited

U.S. PATENT DOCUMENTS

| | | | |
|---|---|---|---|
| 8,942,878 B2* | 1/2015 | Schuessler | B60W 50/14 180/65.1 |
| 9,586,478 B2* | 3/2017 | Yasunaga | B60K 35/00 |
| 9,695,747 B2* | 7/2017 | Shibata | G01P 1/07 |
| 9,897,625 B2* | 2/2018 | Teratani | G01P 1/07 |
| 2010/0166210 A1* | 7/2010 | Isozaki | B60L 3/00 381/86 |
| 2011/0085674 A1* | 4/2011 | Fujikawa | G10K 15/02 381/86 |
| 2014/0195088 A1* | 7/2014 | Schuessler | B60W 50/14 701/22 |

FOREIGN PATENT DOCUMENTS

JP 2015-161654 A 9/2015

* cited by examiner

*Primary Examiner* — Erick Solis
(74) *Attorney, Agent, or Firm* — Birch, Stewart, Kolasch & Birch, LLP

(57) ABSTRACT

A control apparatus for a vehicle includes a determination unit that determines whether or not a start condition is established, the start condition including a torque converter is in a non-lock-up state and the vehicle is starting; and a display control unit that causes a virtual number of rotations to be displayed on a tachometer instead of an actual number of rotations when it is determined by the determination unit that the start condition is established. The display control unit calculates an acting number of rotations by referring to the actual number of rotations and a number of rotations on a driving wheel side relative to the torque converter in an automatic transmission, and causes the acting number of rotations to be displayed on the tachometer as the virtual number of rotations.

9 Claims, 3 Drawing Sheets

CONTROL APPARATUS FOR VEHICLE

CROSS-REFERENCE TO THE RELATED APPLICATION

This application incorporates by references the subject matter of Application No. 2017-002104 filed in Japan on Jan. 10, 2017 on which a priority claim is based under 35 U. S. C. § 119(a).

FIELD

The present invention relates to a control apparatus for a vehicle that carries out a control to modify a display of a tachometer at a start of the vehicle where a torque converter is in a non-lock-up state.

BACKGROUND

A vehicle is provided with a tachometer for indicating the number of rotations of an engine, and a driver can recognize the number of rotations of the engine by checking the display of the tachometer. A tachometer is generally controlled on the basis of signals from a sensor that detects the actual number of rotations of the engine. For example, the value of the actual number of rotations of the engine or a value corrected by eliminating a minute fluctuation from the actual number of rotations is displayed on the tachometer. A technique is proposed which provides a tachometer display expected by a driver when an automatic transmission is shifted, by displaying, on the tachometer, a virtual number of rotations independent of the actual number of rotations of the engine upon the shift change (e.g., refer to Japanese Laid-open Patent Application No. 2015-161654).

In the meantime, the display of the tachometer abruptly changes when the actual number of rotations of the engine surges at a start of the vehicle. Because the actual movement of the vehicle is slow, however, there is an inconsistency between the acceleration feeling felt by the driver (moderate vehicle behavior) and the display of the tachometer, which may create a sense of mismatch (the sense of rotations being too high) in the driver. In such a case, the actual number of rotations of the engine is already increased, but the vehicle accelerates gradually. As a result, the display of the tachometer remains stuck at a high level of the actual number of rotations, which may also create a sense of mismatch (the sense of engine rotations remaining stuck at a high level).

SUMMARY

Technical Problems

The present invention has been made in the light of the aforementioned issues, and an object thereof is to provide a control apparatus for a vehicle that can suppress the sense of mismatch caused by a display of a tachometer when a vehicle starts. In addition to the above-identified object, it is another object of the present invention to provide advantages and effects that are derived from the elements described in the DESCRIPTION OF EMBODIMENTS discussed below, but cannot be achieved by conventional techniques.

Solution to Problems (1) A control apparatus for a vehicle disclosed therein includes an engine, an automatic transmission including a torque converter, and a tachometer that displays an actual number of rotations of the engine, the control apparatus including: a determination unit that determines whether or not a start condition is established, the start condition including the torque converter is in a non-lock-up state and the vehicle is starting; and a display control unit that causes a virtual number of rotations to be displayed on the tachometer instead of the actual number of rotations when it is determined by the determination unit that the start condition is established, wherein the display control unit calculates an acting number of rotations by referring to the actual number of rotations and a number of rotations on a driving wheel side relative to the torque converter in the automatic transmission, and causes the acting number of rotations to be displayed on the tachometer as the virtual number of rotations.

(2) Preferably, the display control unit calculates the acting number of rotations using the actual number of rotations and the number of rotations on the driving wheel side relative to the torque converter in the automatic transmission, and a predetermined weighting coefficient.

(3) Preferably, the weighting coefficient is set to a value that is 0.5 or more and is 1.0 or less.

(4) Preferably, the virtual number of rotations includes the acting number of rotations and an initial number of rotations is incremented at a predetermined rate of change from the actual number of rotations at a time of a start of the vehicle, and the display control unit initiates to calculate the acting number of rotations and causes the initial number of rotations to be displayed on the tachometer as the virtual number of rotations from the time of the start, and causes the acting number of rotations to be displayed on the tachometer instead of the initial number of rotations, once the acting number of rotations matches the initial number of rotations.

(5) Preferably, the display control unit sets the rate of change to a greater value as the accelerator opening at the time of the start is larger.

Advantageous Effects

In accordance with the control apparatus for the vehicle disclosed, even when the actual number of rotations of the engine surges at a start of the vehicle, it is possible to make the display of the tachometer to be further closer to the actual vehicle behavior. As a result, the sense of mismatch caused by the display of the tachometer can be reduced.

BRIEF DESCRIPTION OF DRAWINGS

The nature of this invention, as well as other objects and advantages thereof, will be explained in the is following with reference to the accompanying drawings, in which like reference characters designate the same or similar parts throughout the figures and wherein.

DESCRIPTION OF EMBODIMENTS

A control apparatus for a vehicle as an embodiment will be described with reference to the drawings. The embodiment discussed below is merely exemplary, and it is not intended to exclude various modifications and applications of techniques not explicitly described in the following embodiment. Elements of the present embodiment may be embodied in a wide variety of modifications without departing from the spirit thereof. Further, the elements may be selectively omitted where necessary, or may be combined as appropriate.

[1. Configuration of Apparatus]

Figure 1:
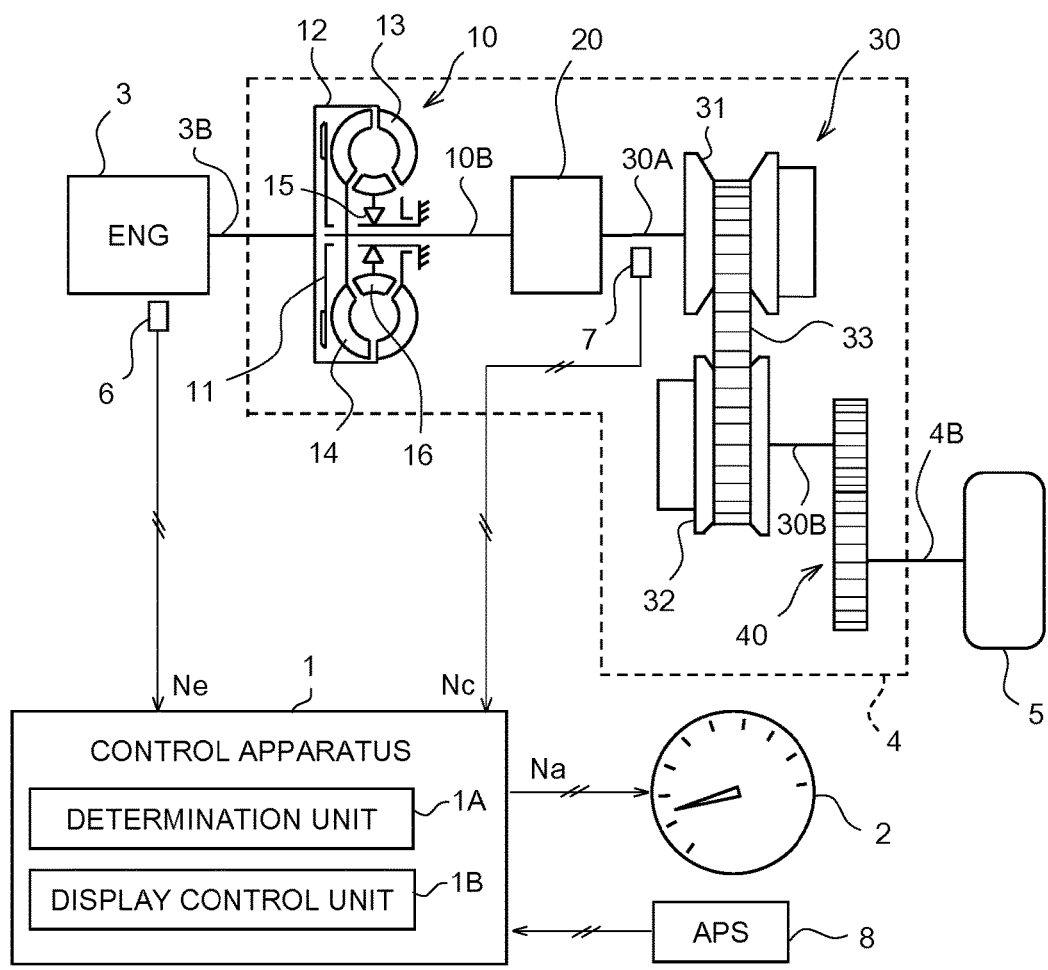
FIG. 1 is a block diagram of a control apparatus in accordance with an embodiment and a schematic diagram exemplifying a configuration of a vehicle in which this control apparatus is applied.

As shown in FIG. 1, a control apparatus 1 of the present embodiment is applied to a vehicle having an engine 3 as a driving source. The engine 3 and an automatic transmission 4 are provided in the drive system of the vehicle, and an output axis 4B of the automatic transmission 4 is connected to driving wheels 5. A tachometer 2 that displays a value based on the actual number of rotations Ne of the engine 3 is also provided at the vehicle.

The engine 3 is a typical gasoline or diesel engine, for example, and operations of the engine 3 are controlled by an engine control apparatus that is not shown.

The automatic transmission 4 is configured from a torque converter 10, a forward/backward switching mechanism 20, a belt-type continuously variable transmission mechanism 30 (hereinafter referred to as the "CVT 30"), and a set of gears 40, which are enclosed in a housing, and operations of the automatic transmission 4 are controlled by a shift change control unit that is not shown.

The torque converter 10 is a starting element having a function to increase the torque. The torque converter 10 includes a pump impeller 13 that is coupled to an output axis 3B of the engine 3 (an input axis of the automatic transmission 4, an input axis of the torque converter 10) via a housing 12, a turbine liner 14 that is coupled to an output axis 10B of the torque converter 10 (an input axis of the forward/backward switching mechanism 20), and a stator 16 provided at a case via a one-way clutch 15.

The torque converter 10 further includes a lock-up clutch 11 to which the input axis 3B and the output axis 10B of the torque converter 10 can be directly connected. Note that the lock-up clutch 11 is coupled to the output axis 3B by a spline, and is coupled to or decoupled from the housing 12 by means of a hydraulic pressure control. Hereinafter, the state in which the lock-up clutch 11 is opened is referred to as the "non-lock-up state", and the state in which the lock-up clutch 11 is engaged (the state in which the engine 3 and the turbine liner 14 are directly connected) is referred to as the "lock-up state".

The forward/backward switching mechanism 20 is a mechanism to switch a rotation direction to be input to the CVT 30, between the forward direction for driving the vehicle forward and the reverse direction for driving the vehicle backward, and is configured from a planetary gear mechanism, and frictional engagement elements, such as a clutch and a brake, for example.

The CVT 30 is a mechanism to vary the ratio (i.e., transmission ratio) of the input rotation speed and the output rotation speed, of the automatic transmission 4 continuously (steplessly). The CVT 30 includes a primary pulley 31, a secondary pulley 32, and a belt 33 passed around the two pulleys 31, 32. The primary pulley 31 is provided around a primary axis 30A that is connected to the output axis 10B of the torque converter 10 via the forward/backward switching mechanism 20, and the secondary pulley 32 is provided around a secondary axis 30B parallel to the input axis 30A.

Each of the primary pulley 31 and the secondary pulley 32 includes a fixed pulley and a movable pulley that face each other and a hydraulic cylinder that moves the movable pulley to the axial direction. Hydraulic pressure provided to the respective hydraulic cylinders moves the movable pulleys of the primary pulley 31 and the secondary pulley 32, which modifies the winding radii of the belt 33, causing a continuous change of the transmission ratio. Note that the secondary axis 30B is connected to the output axis 4B of the automatic transmission 4 via the set of gears 40. After the speed is changed by the automatic transmission 4, the rotations are delivered to the driving wheels 5, and the vehicle is driven by the rotations of the wheels 5.

The tachometer 2 includes a dial plate having tick marks and a pointer swingably supported on the dial plate, and movement of the pointer is controlled by a display control unit 1B of the control apparatus 1, which will be described later. The tachometer 2 usually displays a value based on the actual number of rotations Ne (hereinafter referred to as a "value equivalent to the actual number of rotations"), except for during an acting control, which will be described later. The "value equivalent to the actual number of rotations" as used herein may be the actual number of rotations Ne, or a corrected value of the actual number of rotations Ne (e.g., a value corrected by eliminating a minute fluctuation). The tachometer 2 of the present embodiment usually displays the actual number of rotations Ne as the value equivalent to the actual number of rotations.

The vehicle is provided with a rotation number sensor 6 that detects the actual number of rotations Ne of the engine 3, an input rotation number sensor 7 that detects the number of rotations of the primary axis 30A as an input number of rotations Nc of the CVT 30, and an accelerator opening sensor 8 that detects a quantity of depression of an accelerator pedal (accelerator opening). The information (the actual number of rotations Ne, the input number of rotations Nc, and the accelerator opening) detected by the sensors 6-8 is transmitted to the control apparatus 1. Note that the input number of rotations Nc is the number of rotations on the driving wheel 5 side relative to the torque converter 10 in the automatic transmission 4.

The control apparatus 1 is an electronic control apparatus that integrates and controls various devices mounted in the vehicle. The control apparatus 1 is configured as an LSI device having a microprocessor, ROMs, and RAMs integrated thereon, or a built-in electronic device, for example, and is connected to a communication line of an in-vehicle network provided in the vehicle. The control apparatus 1 of the present embodiment carries out the acting control for the tachometer 2 when a predetermined start condition is established.

[2. Summary of Control]

The acting control is a control for causing a virtual number of rotations Na to be displayed on the tachometer 2, instead of the actual number of rotations Ne, when the predetermined start condition is established. The virtual number of rotations Na is a virtual number of rotations calculated based on the actual number of rotations Ne and the input number of rotations Nc. The acting control is carries out when the torque converter 10 is in the non-lock-up state and the vehicle is starting (i.e., the accelerator is changed from off to on), and is terminated when the torque converter 10 becomes the lock-up state.

Figure 2:
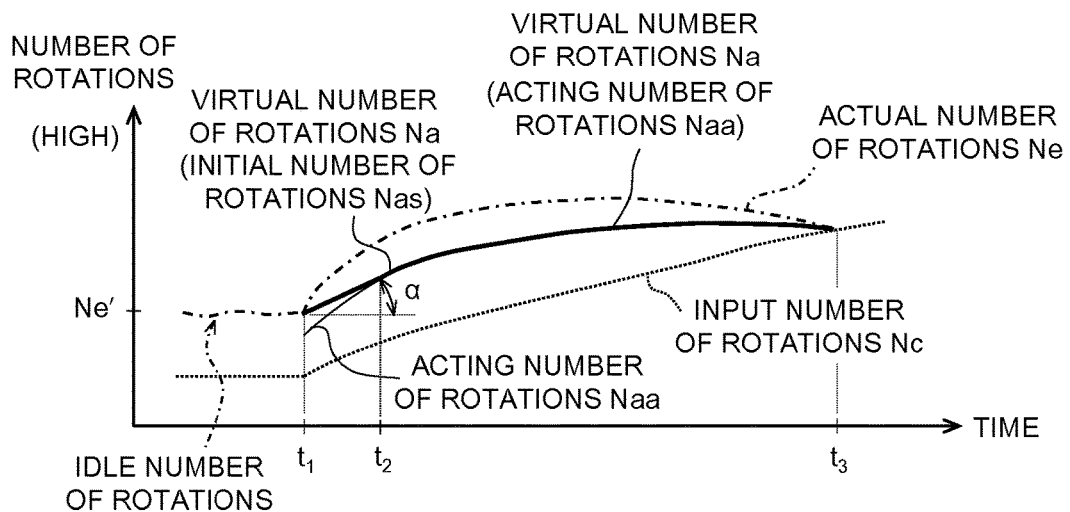
FIG. 2 is a graph indicating changes in the numbers of rotations at a start of the vehicle.

At a start of the vehicle, the torque converter 10 is set to the non-lock-up state to increase the torque. In this case, depending on the quantity of depression of the accelerator pedal and the depressing speed, as shown in FIG. 2, the actual number of rotations Ne of the engine 3 (shown by the dot-and-dash line in the drawing) may increase in a short time (surge) from the idle number of rotations. Note that Time $t_1$ in FIG. 2 is the time when the accelerator is changed from off to on (when the vehicle is starting), and Time $t_3$ is the time when the torque converter 10 becomes the lock-up state.

Hence, in the acting control of the present embodiment, when the torque converter 10 is in the non-lock-up state and the vehicle is starting, the virtual number of rotations Na is calculated by referring to the actual number of rotations Ne and the input number of rotations Nc. Hereinafter, the virtual number of rotations Na calculated by referring to those parameters is referred to as the "acting number of rotations Naa". As a result, as shown in FIG. 2, the number of rotations (the virtual number of rotations Na indicated by the thick solid line in the drawing) is displayed on the tachometer 2, in which the rate of change of the actual number of rotations Ne is reduced (the change thereof is moderated) while preserving the trend of the change of the actual number of rotations Ne. As a result, the sense of mismatch felt by the driver (the sense of rotations being too high and the sense of rotations remaining stuck at a high level) is reduce.

Note that the sense of rotations being too high refers to a sense of mismatch that may be caused by an inconsistency between the display of the tachometer 2 changing significantly due to the surge of the actual number of rotations Ne, and the acceleration feeling actually felt by the driver. Further, the sense of rotations remaining stuck at a high level refers to a sense of mismatch that may be caused by an inconsistency between the actual number of rotations Ne remaining stuck at a high level and the fact that the vehicle is actually accelerating, because the actual number of rotations Ne surges simultaneously with the start but the vehicle gradually accelerates.

For a calculation of the virtual number of rotations Na, a predetermined weighting coefficient is used. In the present embodiment, the actual number of rotations Ne is multiplied with a predetermined weighting coefficient C. More specifically, assuming that the weighting coefficient C to be multiplied with the actual number of rotations Ne has the range of $0 \leq C \leq 1$, the weight to be multiplied with the input number of rotations Nc is $(1-C)$ and an acting number of rotations Naa is calculated by the following Formula 1:

$$Naa = C \times Ne + (1-C) \times Nc \quad \text{Formula 1}$$

In the present embodiment, the weighting coefficient C is set to a value that is 0.5 or more and is 1.0 or less. Such a range prevents the acting number of rotations Naa from deviating significantly from the actual number of rotations Ne, and reduces the sense of mismatch felt by the driver.

In the acting control of the present embodiment, as shown in FIG. 2, the initial number of rotations Nas that increases with a predetermined rate of change $\alpha$ from the actual number of rotations Ne' at the time of a start (Time $t_1$) or immediately before the start, is calculated. In other words, the virtual number of rotations Na of the present embodiment includes two components: the acting number of rotations Naa and the initial number of rotations Nas. A calculation of the acting number of rotations Naa is initiated at the time of the start (Time $t_1$), and is continued until an end condition of the acting control is established (until Time $t_3$). On the other hand, a calculation of the initial number of rotations Nas is initiated at the time of the start (Time $t_1$), and is terminated when the acting number of rotations Naa matches the initial number of rotations Nas (Time $t_2$).

In the present embodiment, a calculation of the initial number of rotations Nas is carried out at every predetermined time interval $\Delta t$ (e.g., 10 milliseconds (ms) to several dozens of milliseconds). The actual number of rotations Ne' (the idle number of rotations) immediately before the start is used as the initial value of the initial number of rotations Nas. In addition, a value obtained by adding the multiplied value (product) of the rate of change $\alpha$ and the time interval $\Delta t$ to a previously-calculated initial number of rotations Nas (the initial value thereof when the calculation is carried out for the first time) is set as the currently-calculated initial number of rotations Nas ($Nas = Nas + \alpha \times \Delta t$). Hereinafter, the multiplied value (product) of the rate of change $\alpha$ and the time interval $\Delta t$ is denoted as "A" ($A = \alpha \times \Delta t$).

Figure 3:
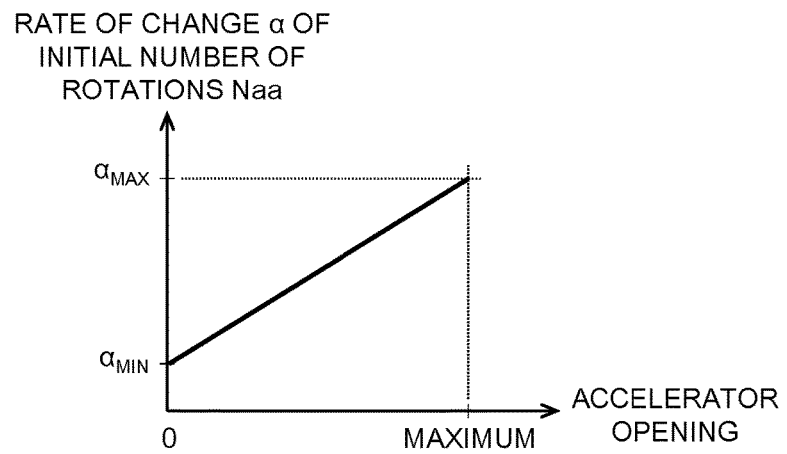
FIG. 3 is an example of a map for determining a rate of change α of an initial number of rotations.

Note that the rate of change $\alpha$ of the initial number of rotations Nas may be selected as a variable that is set in accordance with the accelerator opening at the start, or may be a constant that is set in advance based on an experiment, a simulation, or the like, for example. When the rate of change $\alpha$ is selected as a variable, one method to set the rate of change $\alpha$ is to use a map that defines values of the rate of change $\alpha$ for various values of the accelerator opening, as shown in FIG. 3, for example. In this map, the rate of change $\alpha$ linearly increases between the minimum value $\alpha_{MIN}$ and the maximum value $\alpha_{MAX}$ of the rate of change $\alpha$, as the accelerator opening increases. In other words, the rate of change $\alpha$ increases as the accelerator pedal is depressed stronger.

The initial number of rotations Nas is displayed on the tachometer 2 as the virtual number of rotations Na, from the time of the start of the vehicle until the acting number of rotations Naa matches the initial number of rotations Nas (between Time $t_1$ and $t_2$). Then, the acting number of rotations Naa is displayed on the tachometer 2 as the virtual number of rotations Na, after the acting number of rotations Naa matches the initial number of rotations Nas, until the torque converter 10 becomes the lock-up state (between Time $t_2$ and $t_3$).

The reason why the above controls are carried out is as follows. The actual number of rotations Ne (the idle number of rotations) is displayed on the tachometer 2 up to immediately before the start (i.e., during the idle operation). In this situation, if the display is switched to the acting number of rotations Naa (shown by the thin solid line in the drawing) at the time of the start, the pointer moves suddenly at the start, which may create the sense of mismatch in the driver. Stated differently, the initial number of rotations Nas functions to prevent an abrupt change of the display of the tachometer 2 when the display of the tachometer 2 is switched from the actual number of rotations Ne (the idle number of rotations) to the virtual number of rotations Na.

[3. Control Configuration]

The control apparatus 1 of the present embodiment is provided with a determination unit 1A and a display control unit 1B, as elements for carrying out the acting control described above. These elements represent a part of functions of a program executed on the control apparatus 1, and it is assumed that they are embodied by software. Note that a part or all of those functions, however, may be embodied by hardware (electronic circuits), or may be embodied by a combination of software and hardware.

The determination unit 1A is configured to determine whether or not the start condition and the end condition of the acting control are established. The determination unit 1A determines that the start condition is established when the both of the following Condition 1 and Condition 2 are established:

==Start Condition==

Condition 1: the torque converter 10 is in the non-lock-up state

Condition 2: the vehicle is starting

Condition 2 is determined based on the accelerator opening and/or the depression speed of the accelerator pedal (the accelerator opening speed), for example. Note that the determination unit 1A determines that the end condition is established when Condition 1 described above is not established any more during the acting control. In other words, the end condition is that "the torque converter 10 becomes the lock-up state".

The display control unit 1B is configured to carry out the acting control described above when it is determined by the determination unit 1A that the start condition is established. The display control unit 1B initiates calculations of the acting number of rotations Naa and the initial number of rotations Nas described above, from the time of the start, and causes the initial number of rotations Nas to be displayed on the tachometer 2 as the virtual number of rotations Na. Furthermore, the display control unit 1B causes the acting number of rotations Naa to be displayed on the tachometer 2 instead of the initial number of rotations Nas at the time when the acting number of rotations Naa matches the initial number of rotations Nas. Note that the calculation of the initial number of rotations Nas is ended when the display is switched. Further, when the rate of change α is selected as a variable that varies in accordance with the accelerator opening, the display control unit 1B may determine the rate of change α by applying the accelerator opening at the start, to the map shown in FIG. 3, for example.

[4. Flowchart]

Figure 4:
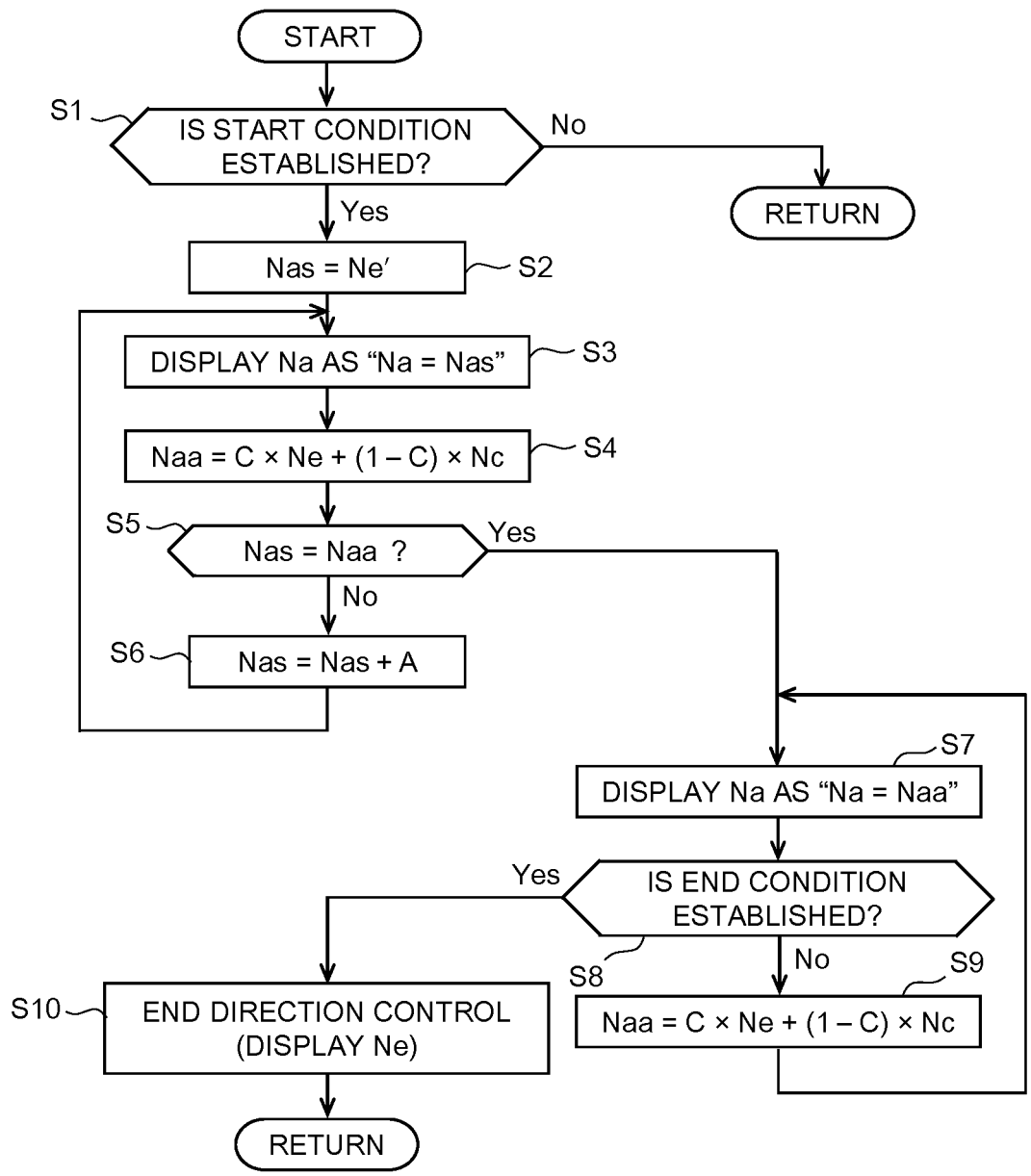
FIG. 4 is a flowchart exemplifying the content of an acting control that is carried out in the control apparatus in accordance with an embodiment.

FIG. 4 is an example of a flowchart describing the contents of the acting control described above. This flowchart is carried out at predetermined calculation cycles in the control apparatus 1 while the main power of the vehicle is turned on. This example assumes that the rate of change α is a constant. It is also assumed that information from various sensors provided at the vehicle (e.g., the rotation number sensor 6 and the input rotation number sensor 7) is delivered to the control apparatus 1 constantly.

In Step S1, it is determined whether or not the above-described start condition is established. When the start condition is not established, the flowchart returns. In contrast, when the start condition is established, the actual number of rotations Ne' at this point in time (when the condition is established) (i.e., the actual number of rotations Ne' immediately before the start) is set (calculated) as the initial value of the initial number of rotations Nas (Step S2) and the value Nas is displayed on the tachometer 2 as the virtual number of rotations Na (Step S3).

In following Step S4, the acting number of rotations Naa is determined (calculated) by referring to the actual number of rotations Ne and the input number of rotations Nc, and it is determined whether or not the acting number of rotations Naa matches the initial number of rotations Nas (Step S5). When this determination results in No, the value obtained by adding the multiplied value A (α×Δt) to the current value of the initial number of rotations Nas is set (calculated) as the subsequent initial number of rotations Nas (Step S6) and the flowchart moves back to Step S3.

Specifically, the initial number of rotations Nas that has been calculated in Step S6 is displayed on the tachometer 2 (Step S3), the acting number of rotations Naa is calculated (Step S4), and the determination in Step S5 is made. The pointer (display) of the tachometer 2 raises at the constant rate of change α as the above processing is repeated until the determination in Step S5 becomes Yes.

When the determination in Step S5 becomes Yes, the acting number of rotations Naa that has been calculated in Step S4 in this calculation cycle is displayed on the tachometer 2 as the virtual number of rotations Na (Step S7). It is then determined whether or not the above-described end condition is established (Step S8). When the determination results in No, the flowchart proceeds to Step S9 in which the acting number of rotations Naa is calculated. The flowchart proceeds back to Step S7 and the acting number of rotations Naa that has been calculated is displayed on the tachometer 2. In this manner, the acting number of rotations Naa calculated in Step S9 is the displayed on the tachometer 2 until the end condition is established. Once the end condition is established, the acting control is terminated and the actual number of rotations Ne is displayed on the tachometer 2 (Step S10).

[5. Advantageous Effects]

(1) In the above-described control apparatus 1, when the above-described start condition is established, the acting number of rotations Naa that is determined (calculated) by referring to the actual number of rotations Ne and the input number of rotations Nc, is displayed on the tachometer 2 as the virtual number of rotations Na. Therefore, even when the actual number of rotations Ne surges at a start of the vehicle, it is possible to make the display of the tachometer 2 to be closer to the actual vehicle behavior. As a result, the sense of mismatch caused by the display of the tachometer 2 (the sense of rotations being too high, the sense of rotations remaining stuck at a high level) can be reduced. Even in cases where the actual number of rotations Ne does not surge, it is possible to make the display of the tachometer 2 to be closer to the actual vehicle behavior by carrying out the acting control described above. As a result, the sense of mismatch of the driver at the start can be reduced.

(2) Further, in the above-described control apparatus 1, because the acting number of rotations Naa is calculated using the actual number of rotations Ne and the input number of rotations Nc, together with the predetermined weighting coefficient C, the control configuration can be simplified. Further, by setting the weighting coefficient C to an appropriate value, it is possible to make the display of the tachometer 2 to be further closer to the actual vehicle behavior, and the sense of mismatch caused by the display of the tachometer 2 can be further reduced.

(3) Particularly, because the weighting coefficient C is set to a value that is 0.5 or more and is 1.0 or less, the acting number of rotations Naa is prevented from deviating significantly from the actual number of rotations Ne. This further reduces the sense of mismatch of the driver.

(4) In the control apparatus 1 described above, the initial number of rotations Nas is also supplied as a component of the virtual number of rotations Na, and the initial number of rotations Nas is displayed on the tachometer 2 from the time of the start. On the other hand, a calculation of the acting number of rotations Naa is initiated from the time of the start, and the acting number of rotations Naa is displayed on the tachometer 2 after the acting number of rotations Naa matches the initial number of rotations Nas. Such a configuration helps to prevent the display of the tachometer 2 from changing abruptly from the actual number of rotations Ne' immediately before the start (the idle number of rotations). This further reduces the sense of mismatch of the driver.

(5) Furthermore, the configuration in which the rate of change α of the initial number of rotations Nas is calculated to a greater value as the accelerator opening increases can make the display of the tachometer 2 to be further closer to the actual vehicle behavior.

[6. Miscellaneous]

Although an embodiment has been described above, the above-described embodiment may be embodied in a wide variety of modifications without departing from the purpose thereof. The elements of the above-described embodiment may be selectively omitted where necessary, or may be combined as appropriate.

While the above-described embodiment has been descried using the example in which the virtual number of rotations Na includes two components: the acting number of rotations Naa and the initial number of rotations Nas, it is suffice that at least the former component is included. When the latter component is not used, an abrupt change of the display of the tachometer 2 at the time of the start can be suppressed by varying the weighting coefficient C over time after the time of the start, for example. More specifically, the weighting coefficient C may be set to be close to 1.0 at the time of the start, and may be varied such that it approaches 0.5 over time.

Furthermore, the start condition and the end condition of the acting control described above are merely exemplary, and a condition other than the above-described ones (e.g., the vehicle speed is equal to or greater than a predetermined speed) may be added to one start condition. In addition, the weighting coefficient C for calculating the above-described acting number of rotations Naa is not limited to the one described above. Furthermore, the map (FIG. 3) for calculating the rate of change α of the initial number of rotations Nas is merely exemplary, and a map in which the rate of change α increases along a curve with an increase in the accelerator opening may be used, for example. Alternatively, the rate of change α may be calculated with a mathematical formula, instead of the map.

Note that the configuration of the tachometer 2 is not particularly limited. For example, the tachometer 2 may have a configuration in which tick marks and a pointer are both displayed on a liquid-crystal display, or a numerical value may be displayed instead of tick marks and a pointer. Furthermore, the automatic transmission 4 may include a stepped transmission instead of the CVT 30. More specifically, the above-described acting control can be applicable to a vehicle having a multistage automatic transmission. In this case, the input number of rotations of the stepped transmission is defined as the number of rotations on the driving wheel 5 side relative to the torque converter 10 in the automatic transmission.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A control apparatus for a vehicle, the vehicle comprising an engine, an automatic transmission comprising a torque converter, and a tachometer that displays an actual number of rotations of the engine, the control apparatus comprising:
   a determination unit that determines whether or not a start condition is established, the start condition including the torque converter is in a non-lock-up state and the vehicle is starting; and
   a display control unit that causes a virtual number of rotations to be displayed on the tachometer instead of the actual number of rotations when it is determined by the determination unit that the start condition is established,
   wherein the display control unit calculates an acting number of rotations by referring to the actual number of rotations and a number of rotations on a driving wheel side relative to the torque converter in the automatic transmission, and causes the acting number of rotations to be displayed on the tachometer as the virtual number of rotations.

2. The control apparatus according to claim 1, wherein the display control unit calculates the acting number of rotations using the actual number of rotations and the number of rotations on the driving wheel side relative to the torque converter in the automatic transmission, and a predetermined weighting coefficient.

3. The control apparatus according to claim 2, wherein the weighting coefficient is set to a value that is 0.5 or more and is 1.0 or less.

4. The control apparatus according to claim 1, wherein
   the virtual number of rotations includes the acting number of rotations and an initial number of rotations is incremented at a predetermined rate of change from the actual number of rotations at a time of a start of the vehicle, and
   the display control unit initiates to calculate the acting number of rotations and causes the initial number of rotations to be displayed on the tachometer as the virtual number of rotations from the time of the start, and causes the acting number of rotations to be displayed on the tachometer instead of the initial number of rotations, once the acting number of rotations matches the initial number of rotations.

5. The control apparatus according to claim 2, wherein
   the virtual number of rotations includes the acting number of rotations and an initial number of rotations is incremented at a predetermined rate of change from the actual number of rotations at a time of a start of the vehicle, and
   the display control unit initiates to calculate the acting number of rotations and causes the initial number of rotations to be displayed on the tachometer as the virtual number of rotations from the time of the start, and causes the acting number of rotations to be displayed on the tachometer instead of the initial number of rotations, once the acting number of rotations matches the initial number of rotations.

6. The control apparatus according to claim 3, wherein
   the virtual number of rotations includes the acting number of rotations and an initial number of rotations is incremented at a predetermined rate of change from the actual number of rotations at a time of a start of the vehicle, and
   the display control unit initiates to calculate the acting number of rotations and causes the initial number of rotations to be displayed on the tachometer as the virtual number of rotations from the time of the start, and causes the acting number of rotations to be displayed on the tachometer instead of the initial number of rotations, once the acting number of rotations matches the initial number of rotations.

7. The control apparatus according to claim 4, wherein the display control unit sets the rate of change to a greater value as the accelerator opening at the time of the start is larger.

8. The control apparatus according to claim 5, wherein the display control unit sets the rate of change to a greater value as the accelerator opening at the time of the start is larger.

9. The control apparatus according to claim 6, wherein the display control unit sets the rate of change to a greater value as the accelerator opening at the time of the start is larger.

* * * * *